W. T. McCALL & D. L. ORENDORFF.
STACKER.
APPLICATION FILED JULY 1, 1908.
926,587.
Patented June 29, 1909.
5 SHEETS—SHEET 1.
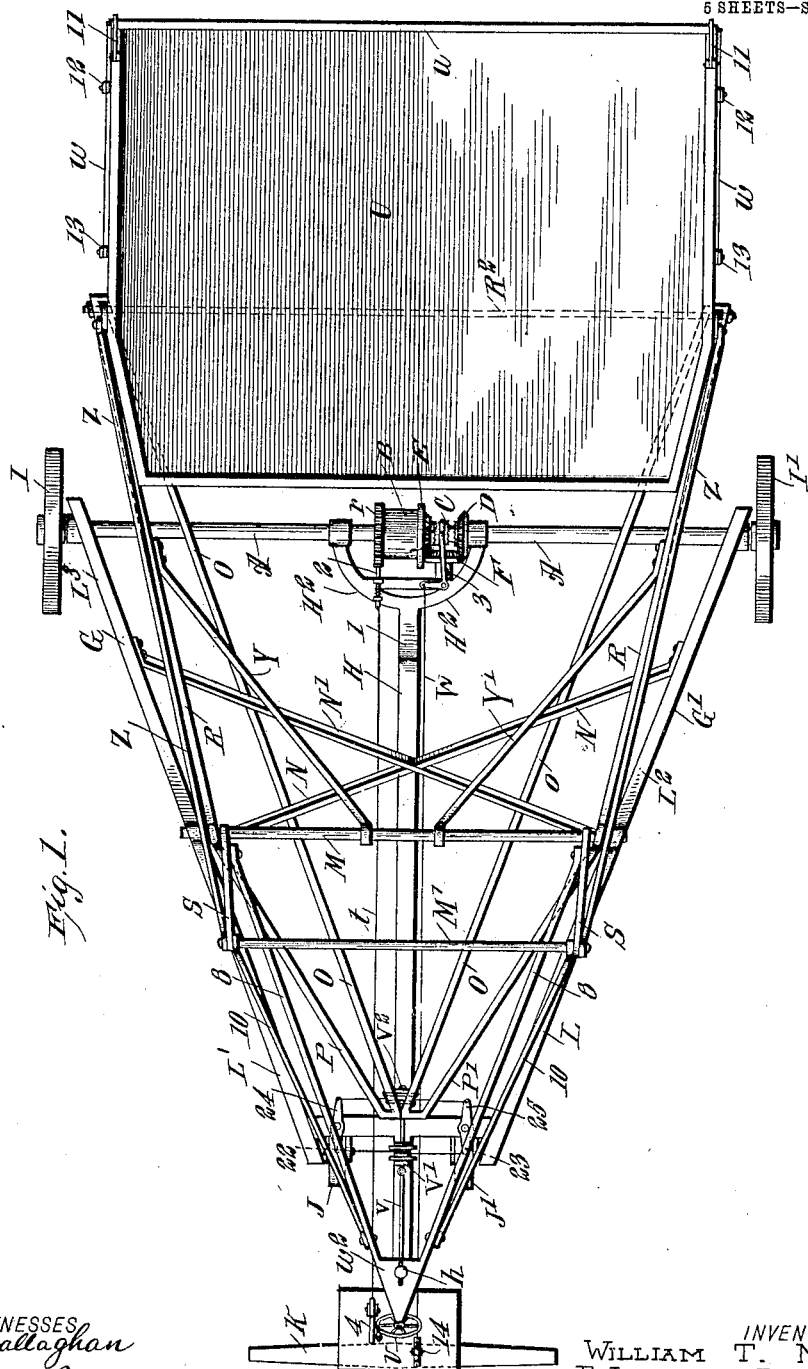
WITNESSES
E. M. Callaghan
Edw. W. Byrn
INVENTORS
WILLIAM T. McCALL
D. LAWRENCE ORENDORFF
BY Munn & Co.
ATTORNEYS

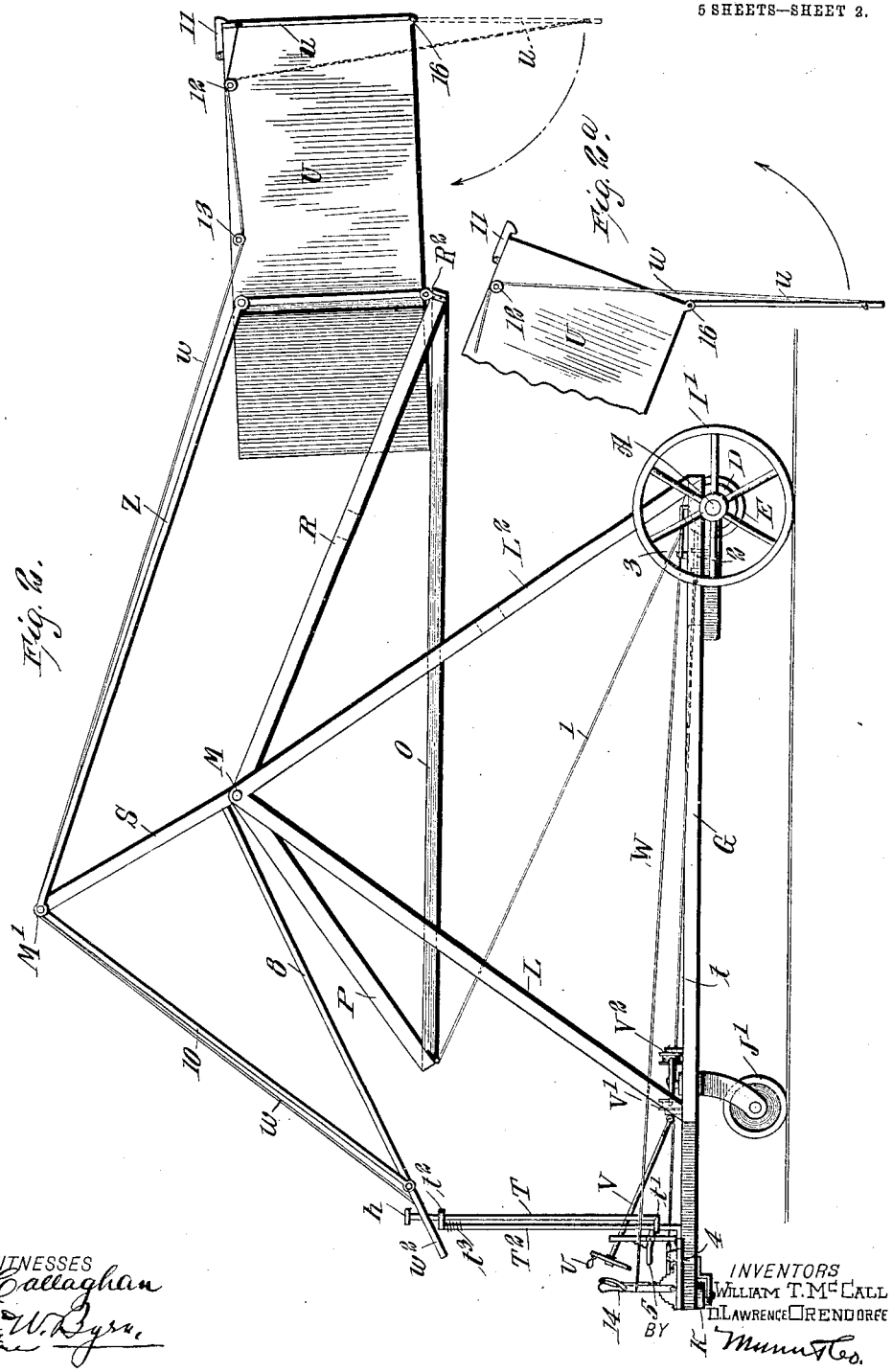

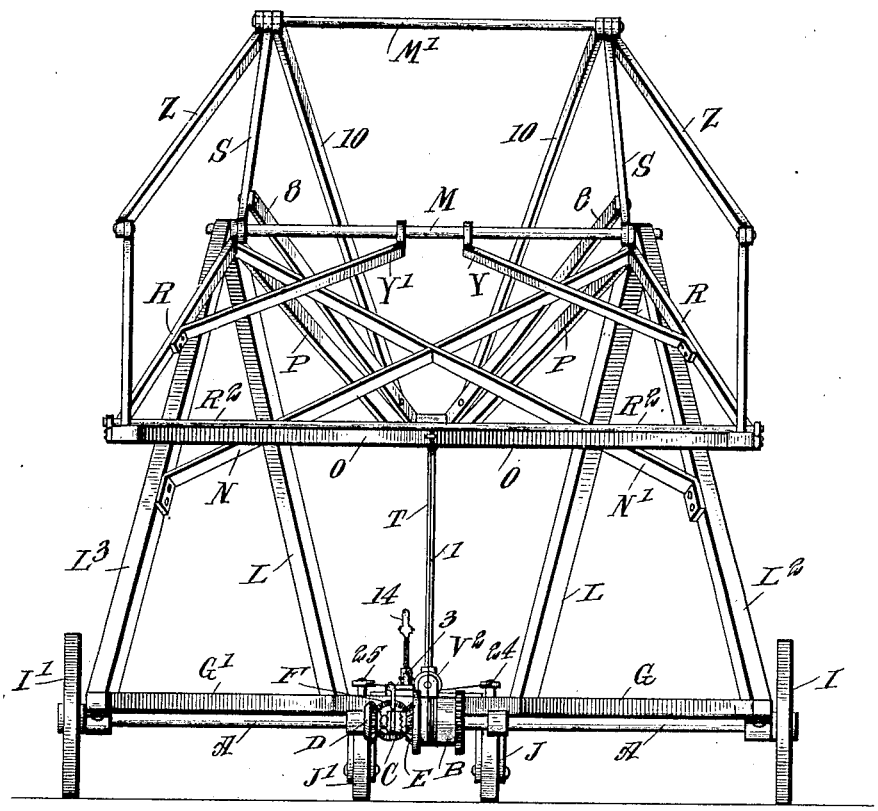

W. T. McCALL & D. L. ORENDORFF.
STACKER.
APPLICATION FILED JULY 1, 1908.
926,587.
Patented June 29, 1909.
5 SHEETS—SHEET 4.
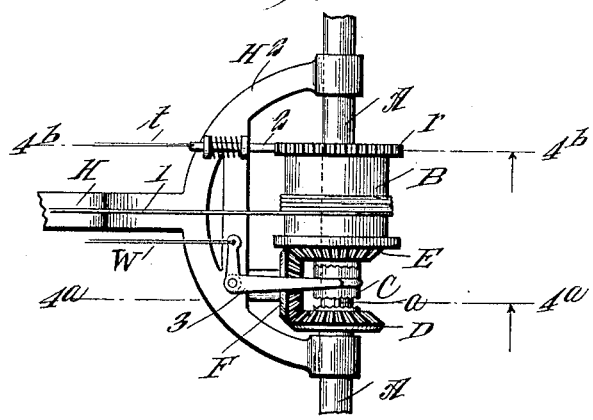
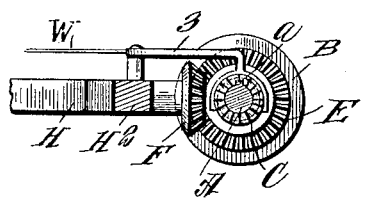
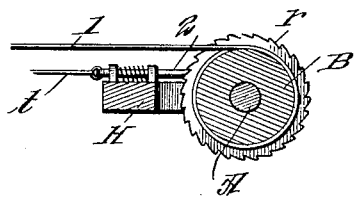
WITNESSES
E. M. Callaghan
Edw. W. Byrn
INVENTORS
WILLIAM T. McCALL
D. LAWRENCE ORENDORFF
BY
Munn & Co.
ATTORNEYS
THE NORRIS PETERS CO., WASHINGTON, D. C.

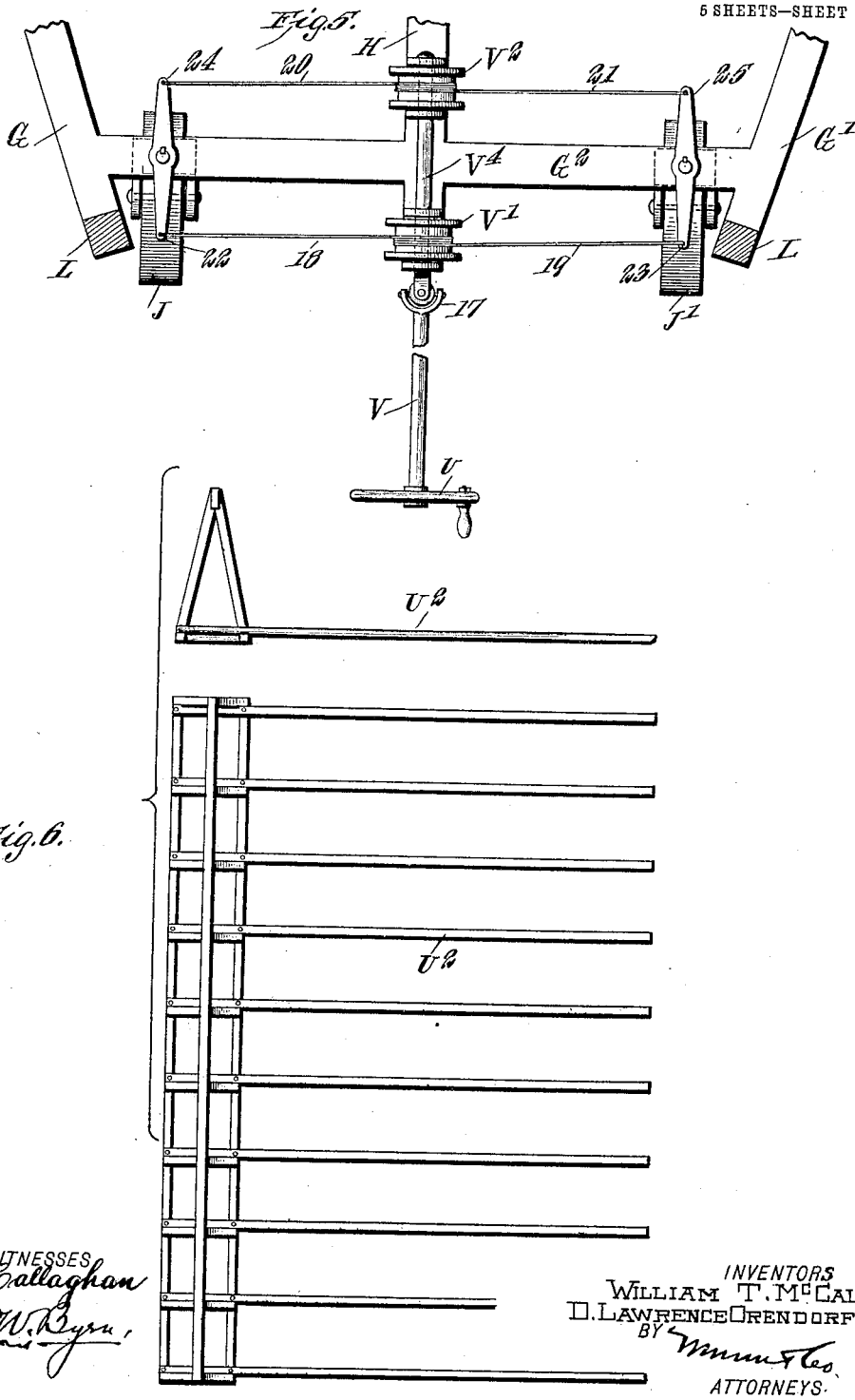

UNITED STATES PATENT OFFICE.

WILLIAM THOMAS McCALL AND DAVID LAWRENCE ORENDORFF, OF MANHATTAN, KANSAS.

STACKER.

No. 926,587.　　　　Specification of Letters Patent.　　　Patented June 29, 1909.

Application filed July 1, 1908. Serial No. 441,345.

*To all whom it may concern:*

Be it known that we, WILLIAM T. McCALL and DAVID LAWRENCE ORENDORFF, citizens of the United States, and residents of Manhattan, in the county of Riley and State of Kansas, have made certain new and useful Improvements in Stackers, of which the following is a specification.

Our invention is in the nature of a device to be used in the field for the purpose of elevating and piling up hay or grain into stacks.

It is intended primarily for the purpose of stacking grain which has been cut by a header, in which the heads of grain with a small proportion of the straw are received into a box-like receptacle and is elevated to pile the same in suitable stacks.

The invention is also applicable for use as a hay stacker by simply substituting for the box-like receptacle a fork adapted to coöperate with the longer hay.

It is an improvement upon that general form of stacker in which a triangular frame mounted upon wheels is provided with an elevated framework carrying a trussed triangular fork frame whose outer end is provided with a lifting fork and whose opposite end is connected by means of a rope with a winding drum for elevating the hay or grain.

Our invention consists in the novel construction and arrangement of the parts and combinations of parts forming an improved stacking device of the kind described as hereinafter more fully set forth.

In the drawing—Figure 1 represents a plan view. Fig. 2 a side elevation. Fig. 2ª a detail view showing a different position of the end of the grain receptacle. Fig. 3 is a front elevation of the entire machine. Fig. 4 is a plan view of the winding drum and its accessories. Fig. 4ª is a section on line 4ª—4ª of Fig. 4, and Fig. 4ᵇ is a section on line 4ᵇ—4ᵇ of Fig. 4. Fig. 5 is a plan view on a larger scale of the steering device, and Fig. 6 represents an end view and a plan view of a form of fork frame to be used in the place of the grain box when our invention is applied to stacking hay instead of headed grain.

Referring to Figs. 1, 2, 3, the frame of the machine is seen mounted upon four wheels, the two large wheels I, I' in front, which are connected to the axle A by the usual ratchet and pawl connections employed in mowers so as to turn the axle when the wheels are moving forward and thus supply power for the operation of the winding drum hereinafter described. The other two wheels of the frame are arranged in the rear and are shown at J, J', and are constructed as caster wheels and coöperate with the steering devices as hereinafter described. The main frame of the stacker is mounted upon sills consisting of two side pieces G and G' arranged in triangular relation to each other, resting at the front ends upon the axle and connected at their rear ends to the cross bar G², resting above the caster wheels, as seen in Fig. 5. H is a central longitudinal supporting bar connected at its forward end by means of a fork H² to the axle A, as seen in Fig. 4 and connected at its rear end to the cross bar G².

Referring to Figs. 1, 2, and 3, the stationary portion of the framework consists of two convergently arranged derrick bars L and L² on one side and L' and L³ on the other, all of which are mounted upon the sills of the main frame and the apices of which convergent side bars on one side are connected to those on the other side by means of a cross bar M, which forms the fulcrum upon which the hoisting and tilting frame turns which carries the load. This hoisting and tilting frame is composed of the bars P, O, R, arranged in triangular relation, which at the upper end are hung upon the cross bar M, which carry at their outer ends the grain box U and at their rear ends are connected by a rope 1 to the winding drum, by the winding up of which rope upon the drum the frame P, O, R, is tilted and the grain box U raised or lowered. The upper part of the grain box is connected by bars Z, Z, to the top of a frame S, S', M' which latter is fulcrumed upon the cross bar M and has rearwardly extending and rigidly attached members 8, 8, and 10, 10 arranged to coöperate with dumping devices as hereafter described.

Referring now to Figs. 4, 4ª and 4ᵇ, the winding device consists of the drum B, to which is rigidly fixed the bevel gear E meshing with a bevel gear F arranged in a plane at right angles and which latter bevel gear F also meshes with another bevel gear D arranged upon the main axle A. Both the drum B with its gear E and the gear D are loose upon the axle A which extends entirely through the same from one running wheel I on one side of the machine to the other one I' on the other side. C is a sliding clutch arranged upon the axle A between the gear wheels E and D and connected to said axle by means of a feather and groove $a$, so that said clutch C is free to move longitudinally on the axle but is compelled to rotate rigidly with it. This clutch C is provided with engaging teeth on both its sides, one of which sets of teeth is arranged to engage similar teeth on the gear E and the other of which sets of teeth is arranged to engage the teeth on gear D, the engagement of said clutches being alternate according to the direction of the adjustment of the clutch C. A winding rope 1, see Fig. 2, is connected to the rear end of the hoisting frame P, O, R, and extends thence to the winding drum B, seen in Fig. 4, around which it is adapted to be wound to turn the hoisting frame P, O, R, upon its fulcrum bar M in raising or lowering the grain box U. On one end of the drum B is arranged a series of ratchet teeth $r$ adapted to be engaged and locked by means of a spring seated detent 2, operated by a pull wire $t$. The clutch C is embraced by a fork on the end of an elbow lever 3, which is fulcrumed to the yoke-shaped piece $H^2$, and which elbow lever is operated by a pull wire W.

When it is desired to lift a load the machine is started forward and the clutch C which slides on the axle A is thrown into engagement with the gear E by means of the lever 3 and pull wire W, which latter passes back to the operator's position, which is upon a platform at the rear end of the machine adjoining the draft appliance K. This causes the drum to wind forward and pulls the rear end of the hoisting frame toward the drum and raises the front end of the hoisting frame and consequently the load contained within the box U. When the load is raised to the desired height, the clutch C may be disengaged and the drum is prevented from unwinding by means of the pawl 2, which engages with the ratchet teeth $r$ of the drum.

When it is desired to lower the load or to return the grain box or hay fork to its position when empty, the clutch C may be engaged to gear E, the pawl 2 raised by means of the pull rod $t$ and foot lever 4 at the rear of the machine and the machine backed, which will result in the unwinding of the drum and the consequent lowering of the grain box or hay fork, or in the place of this method, the clutch C may be engaged with the gear wheel D by means of the elbow lever 3, the pawl 2 disengaged and the machine started forward. The weight of the load will then cause the gear D to rotate with the clutch C, while the intermediate gear F will cause the gear E to turn in the opposite direction from the axle, thus unwinding the drum and lowering the load while the machine is going forward. This is a great advantage in the saving of time. In pointing out a marked advantage of our winding devices, we would state that the strain upon the drum is always borne by both wheels of the axle A, which avoids all contingency of slipping that might occur where the strain is borne by one wheel only.

We will now describe the steering devices for the machine which are located in the rear and are best shown in Figs. 1, 2 and 5. In close proximity to the operator's position in the rear of the machine is arranged a crank wheel $v$ on the rear end of an inclined shaft V which, see Fig. 5, is connected through a universal joint 17 to a short shaft $V^4$ bearing two winding drums V' and $V^2$. One of these winding drums V' is provided with a rope 18, 19, and the other winding drum $V^2$ is provided with a reversely wound rope 20, 21. One end of the rope 20 connects with the forward arm 24 rigidly connected to the upright shaft of the caster wheel J and the end 18 of the rope of the other drum V' connects with the rearwardly extending arm 22 of the shaft of the caster wheel J. In like manner on the other side of the machine the end 19 of the rope of drum V' connects with the rearwardly extending arm 23 and the end 21 of the rope of the drum $V^2$ connects with the forwardly extending arm 25 of the upright shaft of the caster wheel J'. By this arrangement it will be seen that the turning of the drum V' and $V^2$ in a given direction will impart to the rope 18, 19, a reverse movement from the direction of the rope 20, 21, which causes a deflection of the arms 22, 24, and 23, 25, in parallel relation to each other so as to change the plane of the caster wheels J and J' in relation to the line of advance, which gives the desired steering effect. Instead of the arrangement described, chains working on sprockets or jointed rods working on gears will accomplish the same result and are within the scope of our invention.

The frame of our machine consists of the inclined braces L and $L^2$ on one side and L' and $L^3$ on the other, which are jointed together in pairs at the top and kept from spreading by the cross bar M which acts as the fulcrum of the hoisting frame as hereinbefore described. N and N', see Fig. 3, are diagonal cross braces to stiffen the side frames. The hoisting frame consists of the rearwardly converging braces P and P', the bottom arms O and O' and the upper arms R and R' with braces Y and Y' extending from R and R' up to the fulcrum bar M, as seen in Fig. 3. The box frame hinges on the cross bar M as a fulcrum and the cross bar $R^2$ at the forward end of the hoisting frame joining the two sides of the same also acts as a fulcrum on which is supported and tilts the grain box U or the hay fork when that is used in the place of the grain box.

The grain box U, see Fig. 1, is tapered at its rear end to conform to the shape of the machine and rests when being filled on the axle A, being held in position by the rods Z, Z and 10, 10, the rods Z, Z, being pivotally connected to the upper edge of the grain box. For gathering hay, the fork shown in Fig. 6 is pivotally connected on the cross bar R² in the same relation occupied by the grain box U, as seen in Fig. 2.

The means for holding the box or fork parallel to the ground while the load is being raised, owes its efficiency to the fact that said box or fork hinges on the front of the hoisting frame and travels in a circle whose center is the fulcrum bar M, while the box or fork itself is maintained in horizontal position by rods Z, Z, which travel in a circle whose center is the cross bar M' connecting the frame members S, S', at the top. By having the members S and S' longer than the vertical depth of the box U the rods Z, Z, allow the box or fork to gradually dip downward in front as the load is being raised and thus maintains the horizontal position of said box or fork.

We will now describe the means for dumping the grain box U, reference being had to Fig. 2. The front end of the grain box consists of a hinged door $u$ hung to the box at its lower end 16 and provided at the top with catches 11, 11, which hold it closed. From this end door at a point below the catches a rope $w$ extends over pulley 12 and under pulley 13, thence over a pulley on the cross bar M' down to the rear lower end of the frame 8, 10, S, said rope $w$ being attached to said rear end of the frame within easy reach of the operator. The rear end of said frame is provided with a perforated tail piece $w^2$, through which extends the upper end of a sliding bar T. This bar T is provided at its lower end with a sliding keeper $t'$ which embraces a parallel bar $T^2$ fixed in vertical position upon the rear end of the framework immediately adjacent to the position of the operator. The bar $T^2$ is provided at its upper end with a keeper $t^2$ which embraces the parallel bar T. The upper end of the bar T is provided with a suitable head $h$ above the tail piece $w^2$, which head holds the framework 8, 10, S, immovable and prevents the tilting of the box U on its rocking center R². Around the bar $T^2$ is wound a spiral spring $t^3$. When the bar T is in its lowest position its head $h$ holds the frame 8, 10, S, down by the locking engagement of a foot lever 5 which engages with the keeper $t'$ at the lower end of the bar T. When, however, the foot lever 5 is turned from engagement with the lower end of the bar T then the bar T is free to rise from the weight of the loaded box, the keeper $t'$ sliding up over the bar $t^2$ and engaging with a cushion effect the spring $t^3$. This upward movement of the bar T allows the frame 8, 10, S, to move upward and forward causing a thrust upon the bar Z, which turns the grain box U upon its fulcrum center R².

To dump the load the catches 11 holding the front end of the box $u$ in position, are raised and the rope $w$ is slackened, which allows the front end of the box $u$ to turn upon its hinges 16 and drop downward hanging in a vertically pendent position as shown in dotted lines in Fig. 2. It will be noticed that in the position shown in Fig. 2, the box is tilted upward so that its front edges are not in a true vertical position, but the upper part of the end of the box is slightly canted backward. By reason of this fact when the hinged end $u$ of the box drops down, it is not in alinement with the front edges of the box but forms an obtuse angle therewith. By reason of this angle and the fact that the pulley 12 is some distance in rear of the front of the box, the pull of the rope $w$ is in rear of the hinged center 16 and hence the operator is enabled by hauling back upon the rope $w$ to draw the pendent box door $u$ from its dotted line position up to a position closely approximating the bottom of the box where it is out of the way of the stack of grain over which it is placed. Now to complete the dumping process the foot lever 5 at the rear is kicked forward thus releasing the rod T and allowing it to slide upward on rod $T^2$ until stopped by the spring held at the upper end of rod $T^2$. This allows the frame 8, 10, S, to move forward and consequently the box U dips downward and forward at its lower end upon its fulcrum R², thus discharging its load on to the stack. The rope $w$ holding the front door of the box against its bottom is now loosened and as the box is now canted downwardly as shown in Fig. 2ª, the forward edges of said box when in this position are arranged at a reverse angle in relation to the vertically pendent door $u$ with the result that the rope is now on the opposite side of the hinged center 16, so that the pulling upon the rope $w$ will close the hinged door $u$ up against the edges of the box for re-engagement with the catches 11. It will thus be seen that the operation of adjusting the door $u$ to its open position and the closing it again are effected by the operator from the rear end of the machine by simply operating through the rope $w$.

To operate the machine, see Fig. 1, the horses are hitched to the double tree K and the machine moved forward beside the header until a sufficient load of headed grain has been received from the header elevator into the box U. The machine is then driven to the stack and when at a proper distance therefrom, depending upon the height of the stack, the clutch C is thrown into engagement with the gear E by means of the lever 14 at the rear operating through the pull rod W and elbow crank 3. When the drum has wound the load to the desired height, the clutch C is disengaged by means of the lever 14 and the machine advanced to the desired place on the stack on which the load is to be dumped. The catches 11 having been previously disengaged, the rope $w$ holding the front door of the box in place is loosened allowing the door to swing out and down, said door being pulled up and against the bottom of the box as hereinbefore described. As the headed grain is packed tightly against the front door its pressure will immediately cause the door to swing out. The operator then disengages the foot lever 5 and allows the load to dump. This may be done gradually if desired, by the operator's holding on to the tail piece $w^2$ of the frame member 8 acting as a lever, thus causing the box to tip slowly. When the load is dumped the front door $u$ of the box is pulled back by means of the rope $w$ and the box U is tilted back into position by means of the lever frame 8, 10, S, and the lower end of the vertical bar T is reengaged by the foot lever 5. Clutch C is then engaged with gear D, pawl 2 is released by means of the foot lever 4 and the machine started forward and wheeled sharply away from the stack by means of the steering gear and the box is lowered while returning to the header.

It will be seen from the foregoing that every operation except the raising of the catches 11 can be performed from the position of the operator on the rear end of the machine. The catches 11 are raised by the loader before he leaves the box prior to its being elevated.

For stacking hay or grain in the straw the fork shown in Fig. 6 is employed in the place of the grain box U of Fig. 2 and its operation with the single exception of the manipulation of the door $u$ is the same as that hereinbefore described.

In defining our invention with greater clearness we will state that we are aware that the hoisting frame of a hay stacker has been heretofore operated through a rope extending to the winding drum, in which the drum was operated through the agency of one of the running wheels only. In the heavy strain of lifting a large load of grain, the engagement of a single wheel with the ground is insufficient to supply the needed power, so that said single wheel is liable to slip especially on soft ground or when in a cavity in the field. In our invention it will be seen by reference to Fig. 4 that the drum B is driven by the axle A positively from both wheels, the clutch C transmitting the power of both wheels alike alternately to the two bevel gears E and D. This engagement of both wheels of the stacker with the ground utilizes their conjoint tractive strain for the operation of the drum B and the raising of the load.

We claim—

1. A stacker comprising an upright framework having a main fulcrum bar at its upper end, a triangular hoisting frame fulcrumed thereon, a receptacle for the material to be stacked fulcrumed on the outer end of the hoisting frame and a dumping device consisting of a tilting frame mounted on said main fulcrum bar and having bars connecting its upper end to the upper edge of said receptacle, and means for locking and releasing the rear end of said dumping devices.

2. A stacker comprising an upright framework having a fulcrum bar at its upper end, a triangular hoisting frame fulcrumed thereon, a receptacle for the material to be stacked fulcrumed on the outer end of the hoisting frame and a dumping device consisting of a tilting frame mounted on the fulcrum of the main frame and having bars connecting its upper end to the upper edge of said receptacle, and means for locking and releasing the rear end of said dumping devices, consisting of two parallel bars, one of which is connected to the dumping frame and is arranged in slidable relation to the other parallel bar, a cushion spring for the same and a locking device for holding the movable parallel bar in its lowest position.

3. A stacking device consisting of an elevated frame, a triangular hoisting frame fulcrumed upon the top of said elevated frame, a tilting box mounted upon the outer end of said hoisting frame and having an end door hinged at the bottom thereof and catches for holding the top of the same, means for tilting said box on its fulcrum and an operating rope connected to the end gate of said box and arranged to exert a strain upon the end door upon opposite sides of the fulcrum of said door according to the position of the box on its tilting center.

4. In a stacker, the combination with the hoisting frame and a rope attached to the same, of a hoisting drum having a gear wheel on its end, a second gear facing the same, in coaxial alinement, an intermediate gear wheel engaging both of the aforenamed gear wheels, an axle passing entirely through said drum and its opposite gears and bearing running wheels adapted to travel on the ground, a double faced clutch arranged to slide upon said axle longitudinally and to rotate rigidly with it and to engage alternately with the oppositely facing gears, and means for shifting said clutch into alternate engagement with said gears, whereby the drum is actuated from either gear upon the axle with the united effect of both of the running wheels.

5. A stacker comprising a main frame mounted upon running wheels and provided with lifting devices, and a steering mechanism arranged at the rear end of said main frame and consisting of two wheels provided with vertical shafts, each shaft having oppositely projecting crank arms, two drums with a rigidly attached shaft arranged between said wheels, a rope extending from one of said drums to the forward arms of the wheels, a second rope extending from the other drum to the rearward arms of said wheels, said two ropes being wound on their respective drums in opposite directions and a handle shaft for turning the shaft of the drums.

6. A stacker comprising an upright framework, a hoisting frame, a receptacle fulcrumed on one end of said hoisting frame, a dumping device comprising a tilting frame, means for raising and lowering said receptacle, means for maintaining the receptacle in horizontal position during its upward movement, and a common fulcrum for said hoisting frame and said tilting frame.

WILLIAM THOMAS McCALL.
DAVID LAWRENCE ORENDORFF.

Witnesses:
W. W. CARLSON,
E. E. BEIGHLE.